(12) United States Patent
Martinez et al.

(10) Patent No.: US 11,398,936 B2
(45) Date of Patent: Jul. 26, 2022

(54) WIRELESS COMMUNICATIONS DEVICE AND METHOD OF WIRELESS COMMUNICATIONS

(71) Applicant: NXP B.V., Eindhoven (NL)

(72) Inventors: Vincent Pierre Martinez, Roques (FR); Alessio Filippi, Eindhoven (NL); Artur Tadeusz Burchard, Eindhoven (NL)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 16/950,783

(22) Filed: Nov. 17, 2020

(65) Prior Publication Data

US 2022/0038318 A1 Feb. 3, 2022

(30) Foreign Application Priority Data

Jul. 30, 2020 (EP) .................................... 20305872

(51) Int. Cl.
| | |
|---|---|
| *H04L 27/26* | (2006.01) |
| *H04L 5/00* | (2006.01) |
| *H04L 1/18* | (2006.01) |
| *H04L 25/02* | (2006.01) |

(52) U.S. Cl.
CPC ............ *H04L 27/2613* (2013.01); *H04L 1/18* (2013.01); *H04L 5/0023* (2013.01); *H04L 25/0202* (2013.01)

(58) Field of Classification Search
CPC ....... H04L 1/1845; H04L 1/1819; H04L 1/08; H04L 1/1896; H04L 5/0055; H04L 1/1822; H04L 1/0003; H04L 1/1887; H04L 1/189; H04L 5/0053; H04L 27/2613; H04L 5/0023; H04L 1/18; H04L 25/0202
See application file for complete search history.

(56) References Cited

U.S. PATENT DOCUMENTS

| | | | | |
|---|---|---|---|---|
| 8,027,402 | B2 * | 9/2011 | Lee ...................... | H04B 7/0842 |
| | | | | 375/267 |
| 8,121,209 | B2 * | 2/2012 | Lee ......................... | H04L 27/01 |
| | | | | 375/267 |
| 9,300,510 | B2 * | 3/2016 | You ..................... | H04L 27/2602 |
| 9,426,007 | B1 | 8/2016 | Su | |
| 9,525,474 | B2 * | 12/2016 | Park ...................... | H04L 5/0048 |
| 9,998,267 | B2 * | 6/2018 | Wang .................. | H04L 25/0224 |

(Continued)

OTHER PUBLICATIONS

IEEE Computer Society; IEEE Standard 802.11bd/D1.0—Draft Standard for Insormation Technology—Telecommunications and Information Exchange Between Systems Local and Metropolitan Area Networks—Specific Requirements Part 11: Wireless LAN Medium Access Control (MAC) and Physical Layer (PHY) Specifications Amendment 5: Enhancements for Next Generation Vehicular Communication; 102 pages (Sep. 2020).

(Continued)

*Primary Examiner* — James M Perez

(57) ABSTRACT

Embodiments of a device and method are disclosed. In an embodiment, a method of wireless communications involves at a receiver, receiving a first packet, subsequently, at the receiver, receiving a second packet, and determining whether the second packet is a repetition of the first packet based on wireless communications channel estimation information associated with the first and second packets.

20 Claims, 11 Drawing Sheets

(56) References Cited

U.S. PATENT DOCUMENTS

| | | | | |
|---|---|---|---|---|
| 10,292,031 | B1* | 5/2019 | Kerselaers | H04B 5/0031 |
| 10,595,174 | B2* | 3/2020 | Kerselaers | B60W 30/09 |
| 10,790,937 | B1* | 9/2020 | Sun | H04L 1/1664 |
| 10,893,433 | B2* | 1/2021 | Martinez | H04W 28/0236 |
| 2002/0049068 | A1* | 4/2002 | Koo | H04W 52/20 |
| | | | | 455/69 |
| 2003/0112780 | A1* | 6/2003 | Ouyang | H04L 1/1845 |
| | | | | 370/349 |
| 2004/0044784 | A1* | 3/2004 | Hirano | H04W 74/0816 |
| | | | | 709/232 |
| 2008/0229168 | A1* | 9/2008 | Murakami | H04L 1/0045 |
| | | | | 714/751 |
| 2010/0325505 | A1* | 12/2010 | Shimezawa | H04L 1/1819 |
| | | | | 714/748 |
| 2011/0206137 | A1* | 8/2011 | Filippi | H04L 5/0048 |
| | | | | 375/240.26 |
| 2014/0348097 | A1* | 11/2014 | Park | H04L 25/0226 |
| | | | | 370/329 |
| 2015/0109942 | A1 | 4/2015 | Nguyen et al. | |
| 2016/0211960 | A1* | 7/2016 | Wang | H04L 5/0096 |
| 2016/0380727 | A1* | 12/2016 | Ryu | H04L 1/18 |
| | | | | 370/245 |
| 2017/0272211 | A1 | 9/2017 | Chen et al. | |
| 2018/0035331 | A1* | 2/2018 | Sundman | H04W 56/001 |
| 2018/0098322 | A1* | 4/2018 | Yoon | H04W 72/0446 |
| 2019/0239039 | A1* | 8/2019 | Hahn | H04W 28/08 |
| 2020/0015111 | A1* | 1/2020 | Martinez | H04W 28/021 |
| 2020/0053706 | A1* | 2/2020 | Sadeghi | H04W 72/042 |
| 2020/0132829 | A1* | 4/2020 | Jiang | G01S 13/762 |
| 2020/0146044 | A1* | 5/2020 | Maaref | H04W 72/02 |
| 2020/0229032 | A1* | 7/2020 | McCann | H04W 84/12 |
| 2020/0322091 | A1* | 10/2020 | Noh | H04L 27/2628 |
| 2020/0344582 | A1* | 10/2020 | Kenney | H04W 28/065 |
| 2021/0075542 | A1* | 3/2021 | Kneckt | H04W 80/02 |
| 2021/0075551 | A1* | 3/2021 | Kneckt | H04L 1/1812 |
| 2021/0076356 | A1* | 3/2021 | Zhang | H04L 1/188 |
| 2021/0091889 | A1* | 3/2021 | Martinez | H04L 5/0094 |
| 2021/0092038 | A1* | 3/2021 | Burchard | H04W 4/40 |
| 2021/0136625 | A1* | 5/2021 | Jo | H04L 69/22 |
| 2021/0143951 | A1* | 5/2021 | Chu | H04L 5/0044 |
| 2021/0281377 | A1* | 9/2021 | Martinez | H04L 25/0202 |
| 2021/0360672 | A1* | 11/2021 | Kim | H04W 72/0453 |
| 2022/0038206 | A1* | 2/2022 | Martinez | H04L 1/0054 |
| 2022/0038318 | A1* | 2/2022 | Martinez | H04L 1/08 |

OTHER PUBLICATIONS

Alexander, Paul et al; "Cooperative Intelligent Transport Systems: 5.9-Ghz Field Trials"; Proceedings of the IEEE, vol. 99, Issue 7 (Jul. 2011).

Filippi, Alessio et al.; "IEEE802.11p ahead of LTE-V2V for safety application": Reteived from the Internet https://www.nxp.com/docs/en/white-paper/LTE-V2V-WP.pdf; 19 pages (Sep. 27, 2018).

Kudarauskas, Nerijus; "Analysis of Emergency Braking of a Vehicle"; Transport vol. XXII, No. 3; retrieved from the Internet https://www.tandfonline.com/doi/pdf/10.1080/16484142.2007.9638118; 7 pages (2007).

Wikipedia; Coherence time (communication systems); retreived from the Internet https://en.wikipedia.org/wiki/Coherence_time_(communications_systems); 2 pages (Nov. 24, 2020).

National Instruments; "Doppler Spread and Coherence Time"; retreived from the Internet http://www.ni.com/white-paper/14911/en/; (Sep. 25, 2013).

U.S. Appl. No. 17/110,056, filed Dec. 2, 2020, entitled: Wireless Communications Device and Method of Wireless Communications.

NFOA U.S. Appl. No. 17/110,056 dated Apr. 26, 2022, 10 pages.

* cited by examiner

US 11,398,936 B2

WIRELESS COMMUNICATIONS DEVICE AND METHOD OF WIRELESS COMMUNICATIONS

CROSS-REFERENCE TO RELATED APPLICATIONS

This application claims the priority under 35 U.S.C. § 119 of European patent application no. 20305872.2, filed Jul. 30, 2020 the contents of which are incorporated by reference herein.

BACKGROUND

In a wireless communications network, wireless communications can be conducted to pass information between wireless transmitters and wireless receivers. For example, transmissions involving vehicle-to-everything (V2X) communications involve transmission and reception between a vehicle and another entity, and vice versa. In wireless communications, messages with the same structure (e.g., preamble followed by data section) may be repeatedly transmitted. However, typical wireless network technology may not be able to accurately identify message repetitions in wireless communications. Therefore, there is a need for wireless receiver technology that can accurately identify message repetitions in wireless communications.

SUMMARY

Embodiments of a wireless communications device and a method for wireless communications are disclosed. In an embodiment, a method of wireless communications involves at a receiver, receiving a first packet, subsequently, at the receiver, receiving a second packet, and determining whether the second packet is a repetition of the first packet based on wireless communications channel estimation information associated with the first and second packets.

In an embodiment, the method further includes generating a first wireless communications channel estimation metric for the first packet and a second wireless communications channel estimation metric for the second packet.

In an embodiment, determining whether the second packet is a repetition of the first packet based on the wireless communications channel estimation information associated with the first and second packets includes determining that the second packet is a repetition of the first packet when a difference between the first wireless communications channel estimation metric and the second wireless communications channel estimation metric is within a predefined threshold.

In an embodiment, determining whether the second packet is a repetition of the first packet based on the wireless communications channel estimation information associated with the first and second packets further includes determining that the second packet is not a repetition of the first packet when the difference between the first wireless communications channel estimation metric and the second wireless communications channel estimation metric is not within the predefined threshold.

In an embodiment, the wireless communications channel estimation information associated with the first and second packets includes frequency domain channel estimation information associated with the first and second packets.

In an embodiment, the frequency domain channel estimation information associated with the first and second packets includes a first frequency domain channel estimation metric of a symbol of the first packet and a second frequency domain channel estimation metric of a symbol of the second packet.

In an embodiment, the symbol of the first packet comprises a last data symbol of the first packet, and wherein the symbol of the second packet includes a legacy long training field (L-LTF) symbol of the second packet.

In an embodiment, the method further includes calculating a coherency metric of the first frequency domain channel estimation metric of the symbol of the first packet and the second frequency domain channel estimation metric of the symbol of the second packet.

In an embodiment, determining whether the second packet is a repetition of the first packet based on the wireless communications channel estimation information associated with the first and second packets includes determining whether the second packet is a repetition of the first packet based on the coherency metric.

In an embodiment, the frequency domain channel estimation information associated with the first and second packets includes a first frequency domain channel estimation metric associated with different symbols of the first packet and a second frequency domain channel estimation metric associated with different symbols of the second packet.

In an embodiment, determining whether the second packet is a repetition of the first packet based on the wireless communications channel estimation information associated with the first and second packets includes determining that the second packet is a repetition of the first packet when a difference between the first frequency domain channel estimation metric and the second frequency domain channel estimation metric is within a predefined threshold.

In an embodiment, determining whether the second packet is a repetition of the first packet based on the wireless communications channel estimation information associated with the first and second packets further includes determining that the second packet is not a repetition of the first packet when the difference between the first frequency domain channel estimation metric and the second frequency domain channel estimation metric is not within the predefined threshold.

In an embodiment, the method further includes deriving a first coherency time metric based on a plurality of frequency domain channel estimates of the different symbols of the first packet and a second coherency time metric based on a plurality of frequency domain channel estimates of the different symbols of the second packet.

In an embodiment, the wireless communications channel estimation information associated with the first and second packets includes time domain channel estimation information associated with the first and second packets.

In an embodiment, the time domain channel estimation information associated with the first and second packets includes a first plurality of channel taps of the first packet and a second plurality of channel taps of the second packet.

In an embodiment, determining whether the second packet is a repetition of the first packet based on the wireless communications channel estimation information associated with the first and second packets further includes determining whether the second packet is a repetition of the first packet by comparing the first plurality of channel taps of the first packet with the second plurality of channel taps of the second packet.

In an embodiment, the time domain channel estimation information associated with the first and second packets includes a first time domain channel estimation metric associated with different symbols of the first packet and a second time domain channel estimation metric associated with different symbols of the second packet.

In an embodiment, the method further includes deriving a first coherency time metric based on a plurality of time domain channel estimates of the different symbols of the first packet and a second coherency time metric based on a plurality of time domain channel estimates of the different symbols of the to second packet.

In an embodiment, a wireless communications device includes a receiver configured to receive a first packet and, subsequently, a second packet, and to determine whether the second packet is a repetition of the first packet based on wireless communications channel estimation information associated with the first and second packets, and a controller configured to control the receiver to process the first and second packets.

In an embodiment, a method of wireless communications involves at a receiver compatible with an IEEE 802.11 protocol, receiving a first packet, subsequently, at the receiver, receiving a second packet, and determining whether the second packet is a repetition of the first packet based on wireless communications frequency domain or time domain channel estimation information associated with the first and second packets.

Other aspects in accordance with the invention will become apparent from the following detailed description, taken in conjunction with the accompanying drawings, illustrated by way of example of the principles of the invention.

BRIEF DESCRIPTION OF THE DRAWINGS

Throughout the description, similar reference numbers may be used to identify similar elements.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

Figure 1:
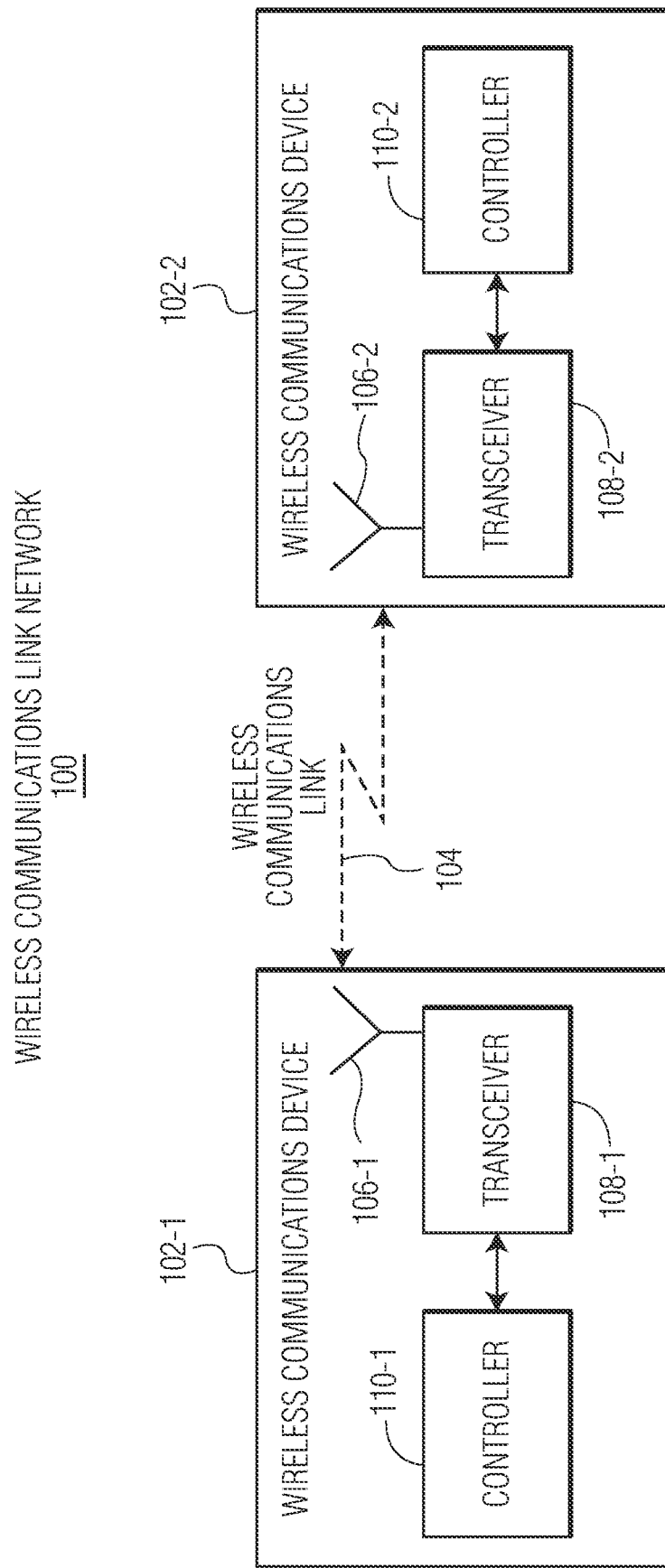
FIG. 1 depicts a wireless communications network that includes multiple wireless communications devices.

FIG. 1 depicts a wireless communications network 100 that includes multiple wireless communications devices 102-1, 102-2. The wireless communications network can be used in various applications, such as automotive applications, industrial applications, medical applications, computer applications, and/or consumer or appliance applications. In some embodiments, the wireless communications devices are implemented in hardware (e.g., circuits), software, firmware, or a combination thereof. Although the illustrated wireless communications network 100 is shown with certain components and described with certain functionality herein, other embodiments of the wireless communications network may include fewer or more components to implement the same, less, or more functionality. For example, in some embodiments, the wireless communications network includes more than two communications devices. In another example, although the wireless communications devices are shown in FIG. 1 as being connected in certain topology, the network topology of the wireless communications network is not limited to the topology shown in FIG. 1.

In some embodiments, the wireless communications network 100 is a vehicle-to-everything (V2X) network and the wireless communications devices 102-1, 102-2 includes at least one vehicle. In some embodiments, the wireless communications devices 102-1, 102-2 includes an electronic control unit (ECU), which is configured to control one or more electronic components within an automobile system such as a vehicle.

In the embodiment depicted in FIG. 1, the wireless communications devices 102-1, 102-2 are configured to determine whether a currently received packet (also referred to as the current packet) is a repetition of a previously received packet (also referred to the previous packet). In some embodiments, the current packet is a repetition of the previous packet when the current packet is an exact copy of the previous packet. The current message may be received at a wireless communications device 102-1 or 102-2 immediately (i.e., without any intermediate packet) after the previous message is received at the wireless communications device 102-1 or 102-2. In some embodiments, the wireless communications devices 102-1, 102-2 are configured to recognize message repetitions by channel estimation analysis and/or usage of signal acquisition metrics. By determining whether a currently received message is a repetition of a previously received message, the wireless communications devices 102-1, 102-2 can improve the performance of the wireless communications network 100. For example, the wireless communications devices 102-1, 102-2 can combine the processing of the message repetitions. Failure to identify that an incoming packet pertained to a repetition series can cause the incoming packet to be decoded "standalone" without combined processing with previous packets, which leads to a performance degradation compared to the ideal situation where the incoming packet is recognized as being part of a repetition series, and its data is thus combined with previous packets' data to yield better decoding performance (which is typically done by means of combining at log likely ratio (LLR) or equalizer stage). In addition, wrong classification of an incoming packet as pertaining to a repetition series although the incoming packet is not a repetition, can cause performance degradation or even decoding error. For example, an incoming packet may be combined with a previously received packet of which the incoming packet is not a repetition, therefore leading to a decoding failure (e.g., a cyclic redundancy check (CRC) failure).

In the embodiment depicted in FIG. 1, each of the wireless communications devices 102-1, 102-2 includes an antenna 106-1 or 106-2, a transceiver 108-1 or 108-2 operably connected to the corresponding antenna, and a controller 110-1 or 110-2 operably connected to the corresponding transceiver. In some embodiments, at least one of the transceivers 108-1, 108-2 includes a physical layer (PHY) device. The controllers 110-1, 110-2 may be configured to control the transceivers 108-1, 108-2 to process received packets through the antennae 106-1, 106-2. In some embodiments, at least one of the controllers 110-1, 110-2 is implemented within a processor, such as a microcontroller, a host processor, a host, a digital signal processor (DSP), or a central processing unit (CPU), which can be integrated in a corresponding transceiver.

In the embodiment depicted in FIG. 1, the wireless communications device 102-1 includes the antenna 106-1, the transceiver 108-1 configured to receive incoming signal (e.g., radio frequency (RF) signals) from the antenna 106-1 and/or to transmit outgoing signals (e.g., RF signals) through the antenna 106-1, and the controller 110-1 configured to control the transceiver 108-1 to process received packets or generate outgoing packets. The antenna 106-1 may be any to suitable type of antenna. In some embodiments, the antenna 106-1 is an induction type antenna such as a loop antenna or any other suitable type of induction type antenna. However, the antenna 106-1 is not limited to an induction type antenna. In some embodiments, the transceiver 108-1 includes a receiver configured to receive signals from the antenna 106-1 and a transmitter configured to transmit signals from the antenna 106-1. In some embodiments, the transceiver 108-1 includes only a receiver configured to receive signals from the antenna 106-1 without any transmitter configured to transmit signals from the antenna 106-1. In some embodiments, the transceiver 108-1 includes only a transmitter configured to transmit signals from the antenna 106-1 without any receiver configured to receive signals from the antenna 106-1. The wireless communications device 102-1 may be fully or partially implemented as an integrated circuit (IC) device. Although the illustrated wireless communications device 102-1 is shown with certain components and described with certain functionality herein, other embodiments of the wireless communications device 102-1 may include fewer or more components to implement the same, less, or more functionality. In some embodiments, the wireless communications device 102-1 is implemented as a wireless communications device that is compatible with IEEE 802.11 protocol, such as IEEE 802.11bd protocol.

In the embodiment depicted in FIG. 1, the wireless communications device 102-2 includes the antenna 106-2, the transceiver 108-2 configured to receive incoming signal (e.g., RF signals) from the antenna 106-2 and/or to transmit outgoing signals (e.g., RF signals) through the antenna 106-2, and the controller 110-2 configured to control the transceiver 108-2 to process received packets or generate outgoing packets. The antenna 106-2 may be any suitable type of antenna. In some embodiments, the antenna 106-2 is an induction type antenna such as a loop antenna or any other suitable type of induction type antenna. However, the antenna 106-2 is not limited to an induction type antenna. In some embodiments, the transceiver 108-2 includes a receiver configured to receive signals from the antenna 106-2 and a transmitter configured to transmit signals from the antenna 106-2. In some embodiments, the transceiver 108-2 includes only a receiver configured to receive signals from the antenna 106-2 without any transmitter configured to transmit signals from the antenna 106-2. In some embodiments, the transceiver 108-2 includes only a transmitter configured to transmit signals from the antenna 106-2 without any receiver configured to receive signals from the antenna 106-2. The wireless communications device 102-2 may be fully or partially implemented as an IC device. Although the illustrated wireless communications device 102-2 is shown with certain components and described with certain functionality herein, other embodiments of the wireless communications device 102-2 may include fewer or more components to implement the same, less, or more functionality. In some embodiments, the wireless communications device 102-2 is implemented as a wireless communications device that is compatible with Institute of Electrical and Electronics Engineers (IEEE) 802.11 protocol, such as IEEE 802.11bd protocol.

In an example operation of the wireless communications network 100, an RF signal is received by the antenna 106-1 of the wireless communications device 102-1 from the antenna 106-2 of the counterpart wireless communications device 102-2 and is passed to the transceiver 108-1 of the wireless communications device 102-1 to convert the RF signal into a digital signal, which can be further processed by the controller 110-1. A signal may be generated in response to the RF signal and is used to produce an outgoing RF signal at the transceiver 108-1, which may be transmitted to the wireless communications device 102-2 using the antenna 106-1.

Figure 2:
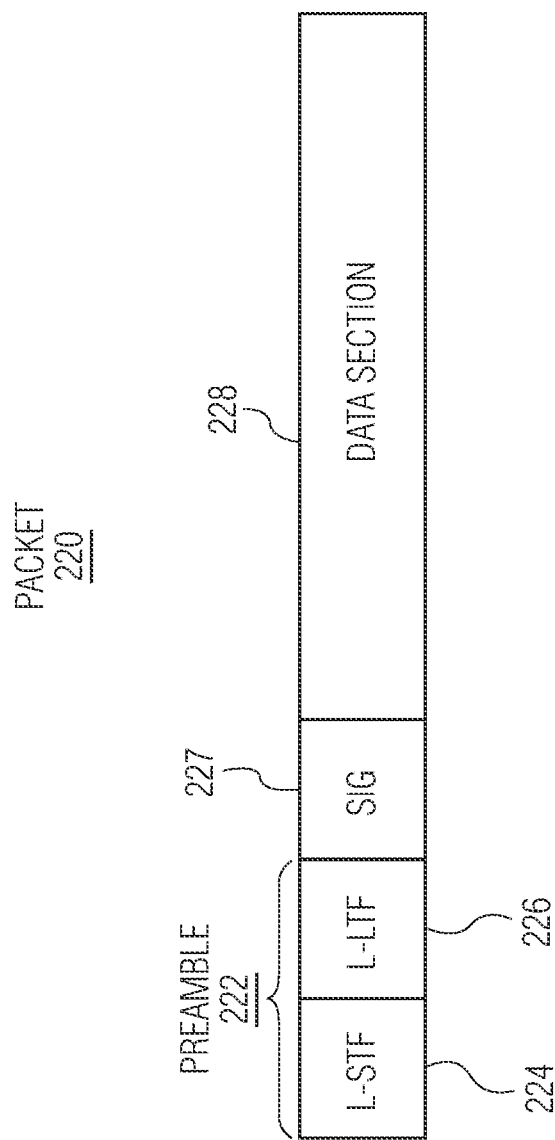
FIG. 2 depicts a packet that can be used in communications between the wireless communications devices of the wireless communications network depicted in FIG. 1 in accordance with an embodiment of the invention.

FIG. 2 depicts a packet 220 that can be used in communications between the wireless communications devices 102-1, 102-2 of the wireless communications network 100 depicted in FIG. 1 in accordance with an embodiment of the invention. As depicted in FIG. 2, the packet includes a preamble 222 that includes a legacy short training field (L-STF) 224 and a legacy long training field (L-LTF) 226, a signal field (SIG) 227, and a data section or a payload 228. Although the illustrated packet 220 is shown with certain sections or components, other embodiments of the packet 220 may include fewer or more sections or components to carry the same, less, or more information. For example, the packet 220 may include a tail section. Examples of information that can be included in the tail section include, without being limited to, protocol type information, address information, packet counter, priority information and error-detecting code (e.g., cyclic redundancy check (CRC)).

Figure 3A:
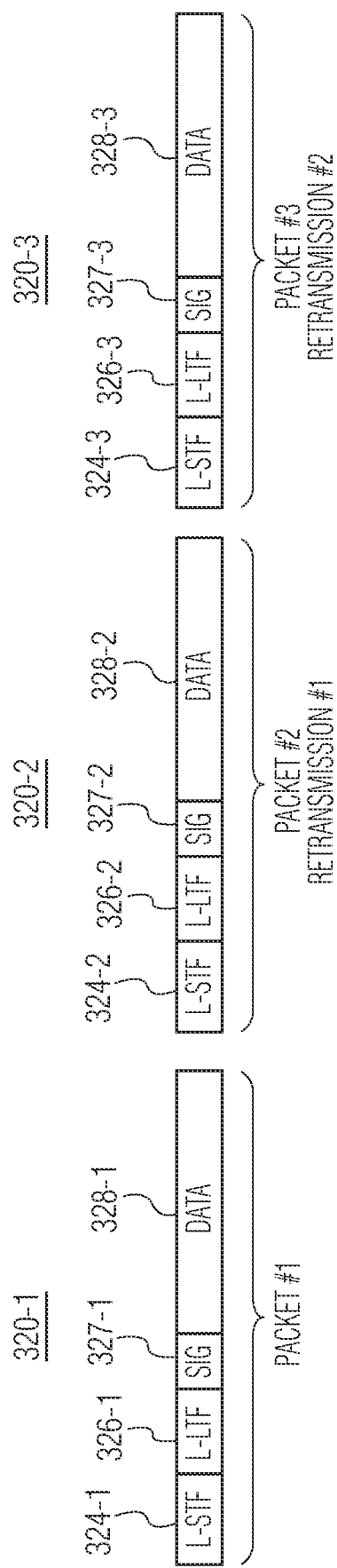
FIG. 3A depicts data communications with repetitions that can be conducted between the wireless communications devices of the wireless communications network depicted in FIG. 1 from transmitter perspective in accordance with an embodiment of the invention.

FIG. 3A depicts data communications with repetitions that can be conducted between the wireless communications devices 102-1, 102-2 of the wireless communications network 100 depicted in FIG. 1 from transmitter perspective in accordance with an embodiment of the invention. As depicted in FIG. 3A, an initial packet 320-1 is transmitted, for example, from the transceiver 108-1 of the wireless communications device 102-1 to the transceiver 108-2 of the wireless communications device 102-2. The initial packet 320-1 includes a preamble that includes an L-STF 324-1 and an L-LTF 326-1, a SIG 327-1, and a data section or a payload 328-1. A first repetition of the initial packet 320-1 (i.e., a packet 320-2) is subsequently transmitted, for example, from the transceiver 108-1 of the wireless communications device 102-1 to the transceiver 108-2 of the wireless communications device 102-2. The packet 320-2 includes a preamble that includes an L-STF 324-2 and an L-LTF 326-2, a SIG 327-2, and a data section or a payload 328-2. A second repetition of the initial packet 320-1 (i.e., a packet 320-3) is subsequently transmitted, for example, from the transceiver 108-1 of the wireless communications device 102-1 to the transceiver 108-2 of the wireless communications device 102-2. The packet 320-3 includes a preamble that includes an L-STF 324-3 and an L-LTF 326-3, a SIG 327-3, and a data section or a payload 328-3. In some embodiments, the repetition packets 320-2, 320-3 are exact copies of the initial packet 320-1.

Figure 3B:
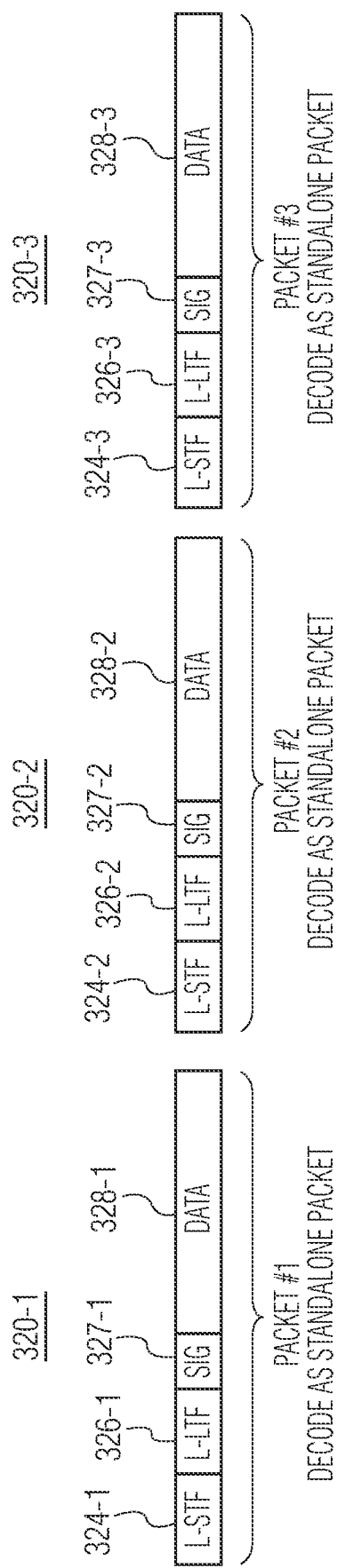
FIG. 3B depicts possible packet processing from receiver perspective for data communications with repetitions that can be conducted between the wireless communications devices of the wireless communications network depicted in FIG. 1.

FIG. 3B depicts possible packet processing from receiver perspective for data communications with repetitions that can be conducted between the wireless communications devices 102-1, 102-2 of the wireless communications network 100 depicted in FIG. 1. In the embodiment depicted in FIG. 3B, the initial packet 320-1, the repetition packet 320-2, and the repetition packet 320-3 are received at the wireless communications device 102-1 or 102-2. As depicted in FIG. 3B, the initial packet 320-1, the repetition packet 320-2, and the repetition packet 320-3 are processed independently from each other. This type of decoding is typically observed with legacy IEEE 802.11p receivers, which are not aware of the repetitions feature, or with IEEE 802.11bd receivers that fail to identify a packet as being part of a repetition series. For example, each of the initial packet 320-1, the repetition packet 320-2, and the repetition packet 320-3 is decoded as a standalone packet. However, independently processing the initial packet 320-1, the repetition packet 320-2, and the repetition packet 320-3 can degrade the performance of the wireless communications device 102-1 or 102-2, compared to the situation where packets are recognized as being part of retransmission series.

Figure 3C:
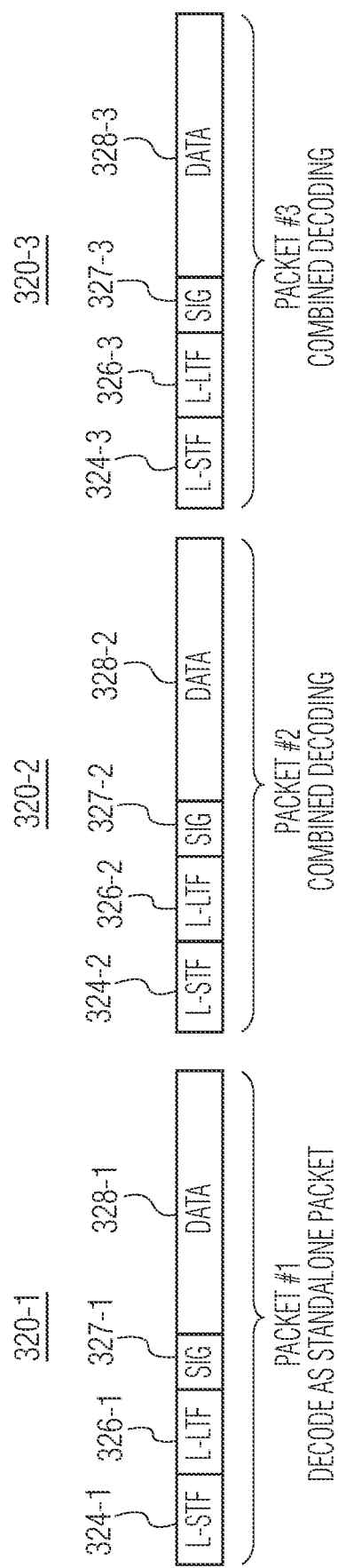
FIG. 3C depicts packet processing from receiver perspective for data communications with repetitions that can be conducted between the wireless communications devices of the wireless communications network in accordance with an embodiment of the invention.

FIG. 3C depicts packet processing from receiver perspective for data communications with repetitions that can be conducted between the wireless communications devices 102-1, 102-2 of the wireless communications network 100 depicted in FIG. 1 in accordance with an embodiment of the invention. In the embodiment depicted in FIG. 3C, the initial packet 320-1, the repetition packet 320-2, and the repetition packet 320-3 are received at the wireless communications device 102-1 or 102-2. As depicted in FIG. 3C, the initial packet 320-1, the repetition packet 320-2, and the repetition packet 320-3 are processed in combination. This type of decoding is typically observed with IEEE 802.11bd receivers that correctly identify a packet as being part of a repetition series. Specifically, the initial packet 320-1 is decoded as a standalone packet, while the repetition packet 320-2 and the repetition packet 320-3 is decoded in combination with the initial packet 320-1. In some embodiments, the repetition packet 320-2 and/or the repetition packet 320-3 may be combined with the initial packet 320-1 at log likelihood ratio (LLR) level. For example, information of the initial packet 320-1 (e.g., LLR values) is saved into an accumulator, information of the repetition packet 320-2 or 320-3 is combined with the information of the initial packet 320-1 that is saved into the accumulator. Compared with independently processing the initial packet 320-1, the repetition packet 320-2, and the repetition packet 320-3, processing the initial packet 320-1, the repetition packet 320-2, and the repetition packet 320-3 in combination can improve the performance of the wireless communications device 102-1 or 102-2.

Figure 4:
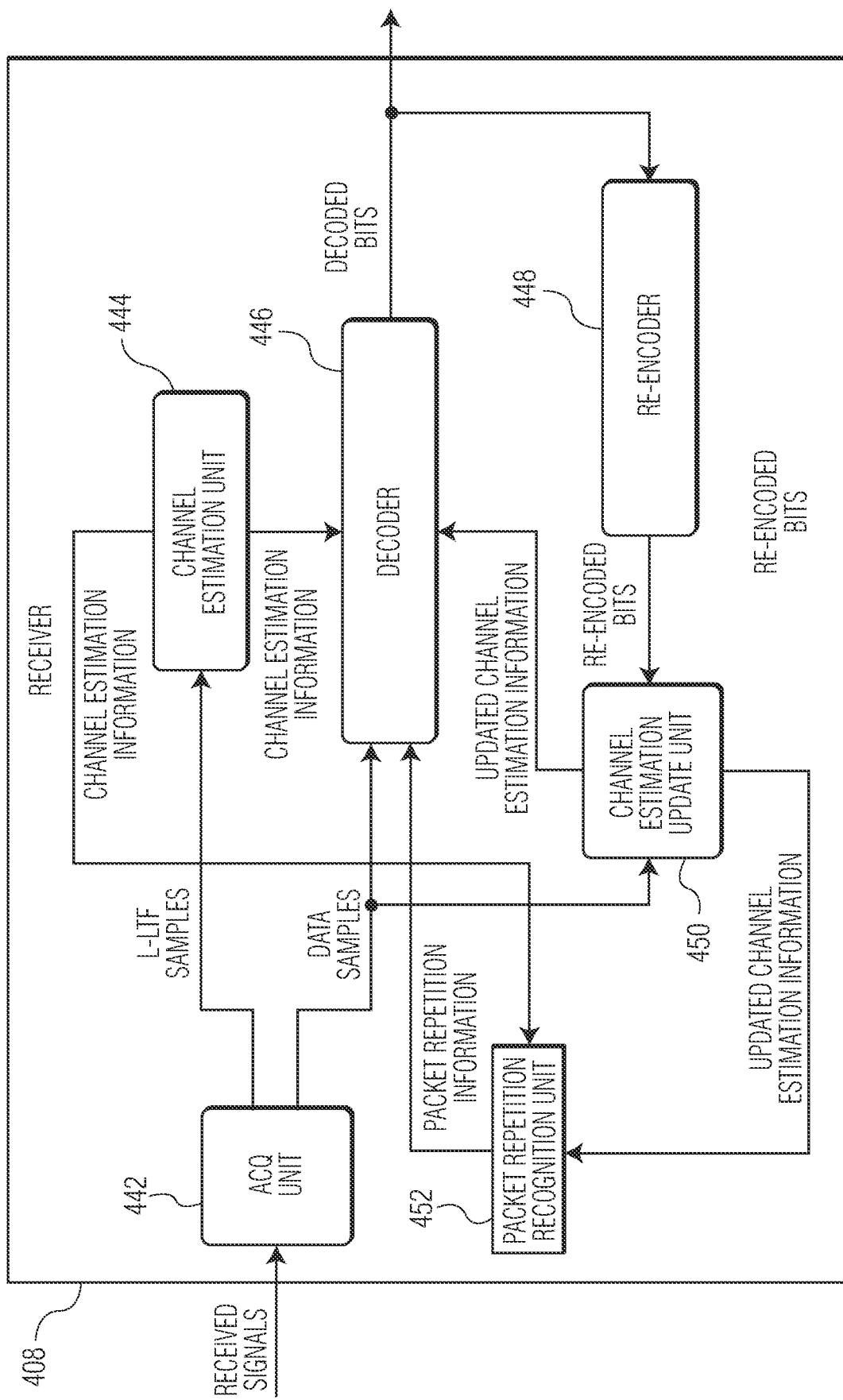
FIG. 4 depicts a receiver that can be used in the wireless communications network depicted in FIG. 1 in accordance with an embodiment of the invention.

FIG. 4 depicts a receiver 408 that can be used in the wireless communications network 100 depicted in FIG. 1 in accordance with an embodiment of the invention. The receiver 408 depicted in FIG. 4 is an embodiment of the transceivers 108-1, 108-2 of the wireless communications devices 102-1, 102-2 depicted in FIG. 1. However, the transceivers 108-1, 108-2 depicted in FIG. 1 are not limited to the embodiment shown in FIG. 4. In the embodiment depicted in FIG. 4, the receiver 408 includes an acquisition (ACQ) unit 442, a channel estimation unit 444, a decoder 446, a re-encoder 448, a channel estimation update unit 450, and a packet repetition recognition unit 452. In some embodiments, at least one of the ACQ unit, the channel estimation unit, the decoder, the re-encoder, the channel estimation update unit, and the packet repetition recognition unit is implemented in hardware (e.g., circuits), software, firmware, or a combination thereof. In some embodiments, the receiver is compatible with an Institute of Electrical and Electronics Engineers (IEEE) 802.11 protocol (IEEE 802.11bd protocol and/or IEEE 802.11p protocol). Although the illustrated receiver 408 is shown in FIG. 4 with certain components and described with certain functionality herein, other embodiments of the receiver 408 may include fewer or more components to implement the same, less, or more functionality. For example, although the packet repetition recognition unit 452 is a component of the receiver 408 in the embodiment depicted in FIG. 4, in other embodiments, the packet repetition recognition unit 452 is located external to the receiver 408. In some embodiments, the packet repetition recognition unit 452 is a component of a corresponding controller (e.g., the controller 110-1 or 110-2 depicted in FIG. 1) of a corresponding wireless communications device (e.g., the wireless communications device 102-1 or 102-2 depicted in FIG. 1).

In the embodiment depicted in FIG. 4, the ACQ unit 442 is configured to process received signals of a packet that is received from a corresponding antenna (e.g., the antenna 106-1 or 106-2 depicted in FIG. 1) to generate legacy long training field (L-LTF) samples or symbols of the preamble of the packet and data samples or symbols of the packet. The channel estimation unit 444 is configured to generate channel estimation information, for example, based on the L-LTF samples of the preamble of the packet.

In the embodiment depicted in FIG. 4, the decoder 446 is configured to decode the data samples of the packet based on the channel estimation information from the channel estimation unit 444 to generate decoded bits. The decoder may be any suitable type of decoder. In some embodiments, the decoder includes an equalizer, a de-interleaving (DIL) unit, a log likelihood ratio (LLR) generation unit, and/or a decoding unit such as a Viterbi decoding unit. In some embodiments, the decoder includes an equalizer configured to receive channel estimation information from the channel estimation unit 444 and to perform signal equalization based on the channel estimation information to generate equalized signals, a DIL unit configured to perform signal de-interleaving to the equalized signals from the equalizer, an LLR generation unit configured to generate a log likelihood ratio for the data samples, and a Viterbi decoding unit configured to perform Viterbi decoding based on the log likelihood ratio from the LLR generation unit to generate decoded bits. In some embodiments, at least one of the equalizer, the DIL unit, the LLR generation unit, and/or the Viterbi decoding unit is implemented in hardware (e.g., circuits), software, firmware, or a combination thereof. Although the decoder 446 is described with certain components and certain functionality herein, other embodiments of the decoder 446 may include fewer or more components to implement the same, less, or more functionality. The decoder 446 is not limited to the examples described above.

In the embodiment depicted in FIG. 4, the re-encoder 448 is configured to re-encode the decoded bits to generate re-encoded bits. The channel estimation update unit 450 is configured to generate an updated channel estimation based on the data samples and the re-encoded bits from the re-encoder. The decoder 446 is further configured to decode the data samples of the packet based on the channel estimation from the channel estimation unit 444 and the updated channel estimation from the channel estimation update unit 450 to generate decoded bits. In the embodiment depicted in FIG. 4, the decoder, the re-encoder, and the channel estimation update unit form a feedback loop, sometimes also referred to as data-aided channel estimation, which is used to continuously update the channel estimation when sweeping over symbols within received packets. For example, the IEEE 802.11p standard has a continuous series of OFDM data symbols, without any extra LTF sections in between. For automotive applications of the IEEE 802.11p standard, in order to cope with fast-varying channels, the feedback loop is used to continuously update the channel estimation when sweeping over OFDM symbols.

In the embodiment depicted in FIG. 4, the packet repetition recognition unit 452 is configured to recognize packet repetition based on channel estimation metrics. In some embodiments, the packet repetition recognition unit is further configured to generate packet repetition information that indicates to whether a currently received packet is a repetition of a previously received packet based on channel estimation metrics. For example, the packet repetition recognition unit may generate packet repetition information that indicates whether a currently received packet is a repetition of a previously received packet based on channel estimation information from the channel estimation unit 444 and/or the channel estimation update unit 450. The currently received packet may be received at the receiver 408 immediately (i.e., without any intermediate packet) after the previously received packet is received at the receiver 408. The packet repetition information that is generated by the packet repetition recognition unit can be used by the receiver 408 to improve the performance of packet processing. In some embodiments, the receiver 408 processes the currently received packet and the previously received packet in combination when the currently received packet is a repetition of the previously received packet. For example, the receiver 408 decodes the currently received packet and the previously received packet in combination when the currently received packet is a repetition of the previously received packet. In these embodiments, the receiver 408 processes (e.g., decodes) the currently received packet and the previously received packet independently from each other when the currently received packet is not a repetition of the previously received packet. By combining the processing of repetitive packets, the performance of the receiver can be improved. In the embodiment depicted in FIG. 4, the packet repetition recognition unit sends the packet repetition information to the decoder for combined decoding of repetitive packets. By combining the decoding of repetitive packets, the performance of the receiver can be improved.

In some embodiments, the packet repetition recognition unit 452 is configured to compare at least one channel estimation metric of a currently received packet with at least one channel estimation metric of a previously received packet to generate packet repetition information that indicates whether the currently received packet is a repetition of the previously received packet. The currently received packet may be received at the receiver 408 immediately (i.e., without any intermediate packet) after the previously received packet is received at the receiver 408. In these embodiments, when a difference between the channel estimation metric of the currently received packet and the channel estimation metric of the previously received packet is within (e.g., less than) a predefined threshold, the packet repetition recognition unit is configured to determine that the currently received packet is a repetition of the previously received packet. The predefined threshold may be derived empirically or theoretically. When empirically derived, the predefined threshold can be precomputed based on simulation or experiment results. For instance, the predefined threshold may be set depending on target or measured signal-to-noise ratio (SNR). In addition, when the difference between the channel estimation metric of the currently received packet and the channel estimation metric of the previously received packet is not within (e.g., exceeds) the predefined threshold, the packet repetition recognition unit 452 is configured to determine that the currently received packet is not a repetition of the previously received packet. For example, the delta between the LTF of the currently received packet (where the initial channel estimation by the channel estimation unit 444 is performed) and the end of the previously received packet is shorter than the coherency time of the wireless communications channel from which the receiver 408 communicates (e.g., the wireless communications channel of the wireless link 104). Consequently, the channel estimate of LTF of the currently received packet resembles the last channel estimate update of the previously received packet when the currently received packet is a repetition of the previously received packet.

Figure 5:
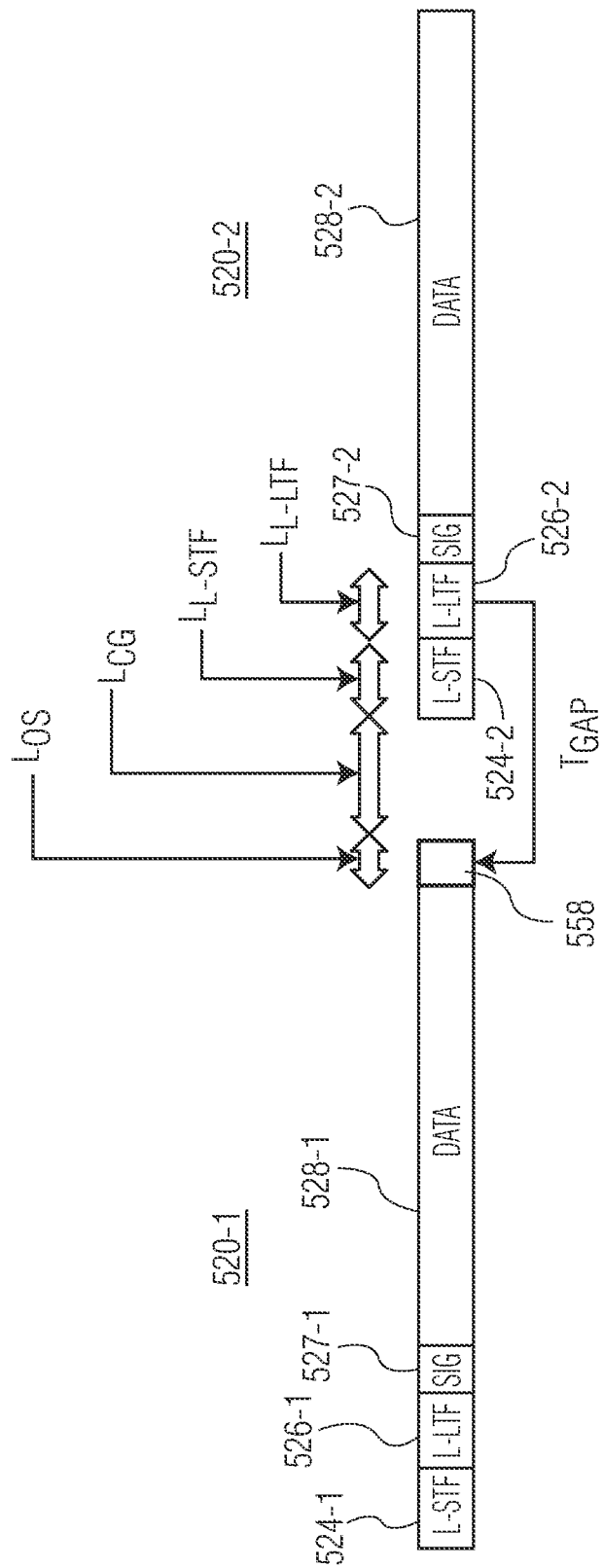
FIG. 5 depicts the delta or time difference between the legacy long training field (L-LTF) of a currently received packet at the receiver depicted in FIG. 4 and the end of a previously received packet at the receiver depicted in FIG. 4.

FIG. 5 depicts the delta between the L-LTF 526-1 of a currently received packet 520-1 at the receiver 408 (where the initial channel estimation by the channel estimation unit 444 is performed) and the end of a previously received packet 520-2 at the receiver 408. In the embodiment depicted in FIG. 5, the currently received packet 520-1 includes a preamble that includes an L-STF 524-1 and an L-LTF 526-1, a SIG 527-1, and a data section or a payload 528-1. The previously received packet 520-2 includes a preamble that includes an L-STF 524-2 and an L-LTF 526-2, a SIG 527-2, and a data section or a payload 528-2. The currently received packet 520-1 and the previously received packet 520-2 may be compatible with IEEE 802.11bd protocol. For example, the configurable gap between the currently received packet 520-1 and the previously received packet 520-2 can be fairly small. For example, proposals at standardization body IEEE 802.11bd specifies that the configurable gap is smaller than Short Inter-frame Spacing (SIFS), which is 32 microsecond (μsec). Consequently, assuming a worst case where the configurable gap is 32 μsec, the time gap from the LTF 526-1 of the currently received packet 520-1 to the last OFDM symbol 558 of the previously received packet 520-2 can be expressed as:

$$T_{GAP} = \frac{L_{OS}}{2} + L_{CG} + L_{L-STF} + \frac{L_{L-LTF}}{2}, \quad (1)$$

where $T_{GAP}$ represents the time gap, Los represents the length of the last OFDM symbol 558, $L_{CG}$ represents the length of the configurable gap, $L_{L-STF}$ represents the length of the L-STF 524-2 of the previously received packet 520-2, and $L_{L-LTF}$ represents the length of the L-LTF 526-2 of the previously received packet 520-2. When the length of the last OFDM symbol 558, Los, is 8 μsec and the length of the L-STF 524-2, $L_{L-STF}$, and the length of the L-LTF 526-2, $L_{L-LTF}$, are 16 μsec, the time gap, $T_{GAP}$, from the LTF 526-1 of the currently received packet 520-1 to the last OFDM symbol 558 of the previously received packet 520-2 is 60 μsec, which is shorter than the coherency time of the wireless communications channel from which the receiver 408 communicates, which is typically higher than 100 μsec. Coherence time is a statistical measure of the time duration over which the channel impulse response is essentially invariant. In case the coherence time is defined as the time over which the time correlation function is above 0.5, the coherence time can be approximated by:

$$T_C = \frac{0.423}{F_D \times 1e^6}, \quad (2)$$

where $T_C$ represents the coherence time in microsecond (μsec), and FD represents the maximum Doppler spread. According to the above equation, for a channel width at 5.9 GHz, the following values of the coherence time, for extreme cases of 250 & 500 km/h (delta between a transmitter and the receiver 408) can be expressed as:

Doppler of 1.85 kHz (250 km/h at 5.9 GHz)+0.2 kHz timing error: $T_C$=206 μsec

Doppler of 3.7 kHz (500 km/h at 5.9 GHz)+0.2 kHz timing error: $T_C$=108 μsec

As shown above, the coherence time, $T_C$, is larger than the worst case of the time gap, $T_{GAP}$, from the LTF 526-1 of the currently received packet 520-1 to the last OFDM symbol 558 of the previously received packet 520-2, which is 60 μsec. Consequently, the channel estimate of LTF of the currently received packet resembles the last channel estimate update of the previously received packet when the currently received packet is a repetition of the previously received packet.

In some embodiments, the packet repetition recognition unit 452 is configured to compare at least one frequency domain channel estimation metric of a currently received packet with at least one frequency domain channel estimation metric of a previously received packet to generate packet repetition information that indicates whether the currently received packet is a repetition of the previously received packet. The currently received packet may be received at the receiver 408 immediately (i.e., without any intermediate packet) after the previously received packet is received at the receiver 408. In these embodiments, when a difference between the at least one frequency domain channel estimation metric of the currently received packet and the at least one frequency domain channel estimation metric of the previously received packet is within (e.g., less than) a predefined threshold, the packet repetition recognition unit is configured to determine that the currently received packet is a repetition of the previously received packet. In addition, when the difference between the at least one frequency domain channel estimation metric of the currently received packet and the at least one frequency domain channel estimation metric of the previously received packet is not within (e.g., exceeds) the predefined threshold, the packet repetition recognition unit is configured to determine that the currently received packet is not a repetition of the previously received packet.

In some embodiments, the receiver 408 (e.g., the channel estimation unit 444, channel estimation update unit 450, and/or the packet repetition recognition unit 452) is configured to measure the coherency for a number of channels. In an embodiment, channel is initially estimated from the L-LTF of a received packet. Channel estimation may involve least square estimate of the channel, by multiplication of two symbols by the conjugate of the reference sequence, and/or FIR Filtering (sometimes referred to as windowing), of the channel in the frequency direction and/or over the time direction. Over the course of the decoding of data symbols of a received packet, the feedback loop formed by the decoder 446, the re-encoder 448, and the channel estimation update unit 450 is used to continuously update the channel estimation, by means of comparing a received symbol with its re-encoded form, essentially turning the dada symbols into extra channel estimation pilots in a process sometimes referred to as "data-aided channel estimation". In some embodiments, the receiver 408 (e.g., the channel estimation unit 444, channel estimation update unit 450, and/or the packet repetition recognition unit 452) is configured to measure the coherency of the frequency domain channel estimates with the following equation:

$$measuredCoherency_{(time=j)} = \frac{\sum_{j=1}^{N_{sym}} \sum_{i=0}^{N_{sub}} |ChannelEstimate_{(i,j)} - ChannelEstimate_{(i,j-1)}|}{\sum_{j=0}^{N_{sym}} \sum_{i=0}^{N_{sub}} |ChannelEstimate_{(i,j)}|}, \quad (3)$$

where i refers to the subcarriers indexing, which may range from 0 to 51 in IEEE 802.11p/bd protocols, j refers to the OFDM symbols, $N_{sym}$ represents the number of symbols within a packet, $N_{Sub}$ represents the number of subcarriers, ChannelEstimate represents a specific frequency domain channel estimate. Since each OFDM symbol lasts for 8 μsec, a resolution of 8 μsec can be used for the channel coherency measurement. Numerical simulations involving an IEEE 802.11bd transmitter and an IEEE 802.11bd receiver having a dada symbol decoder with a feedback loop (e.g., similar to or same as the receiver 408 depicted in FIG. 4) confirm that the observation of the channel estimates in the frequency domain can provide a reliable indication of whether the incoming packet pertains to a repetition series.

In some embodiments, the packet repetition recognition unit 452 is configured to compare a frequency domain channel estimation metric of a symbol of a currently received packet with a frequency domain channel estimation metric of a corresponding symbol of a previously received packet (e.g., a packet received 60 μsec prior to the currently received packet) to generate packet repetition information that indicates whether the currently received packet is a repetition of the previously received packet. The currently received packet may be received at the receiver 408 immediately (i.e., without any intermediate packet) after the previously received packet is received at the receiver 408. In these embodiments, when a difference between the frequency domain channel estimation metric of the symbol of the currently received packet and the frequency domain channel estimation metric of the corresponding symbol of the previously received packet is within (e.g., less than) a predefined threshold, the packet repetition recognition unit is configured to determine that the currently received packet is a repetition of the previously received packet. The predefined threshold may be derived empirically or theoretically. When empirically derived, the predefined threshold can be precomputed based on simulation or experiment results. For instance, the predefined threshold may be set depending on target or measured SNR. In addition, when the difference between the frequency domain channel estimation metric of the symbol of the currently received packet and the frequency domain channel estimation metric of the symbol of the previously received packet is not within (e.g., exceeds) the predefined threshold, the packet repetition recognition unit is configured to determine that the currently received packet is not a repetition of the previously received packet. In an embodiment, the packet repetition recognition unit is configured to compare a frequency domain channel estimation metric of the L-LTF symbol of a currently received packet with a frequency domain channel estimation metric of the last OFDM symbol of a previously received packet (e.g., a packet received 60 μsec prior to the currently received packet) to generate packet repetition information that indicates whether the currently received packet is a repetition of the previously received packet. The initial channel estimation for the currently received packet is performed on the L-LTF symbol of the currently received packet. In this embodiment, the packet repetition recognition unit is configured to calculate the coherency of the frequency domain channel estimates with the following equation:

$$measuredCoherency_{(time)} = \frac{\sum_{j=1}^{2} \sum_{i=0}^{N_{sub}} |ChannelEstimate_{(i,j)} - ChannelEstimate_{(i,j-1)}|}{\sum_{j=1}^{2} \sum_{i=0}^{N_{sub}} |ChannelEstimate_{(i,j)}|}, \quad (4)$$

where i refers to the subcarriers indexing, which may range from 0 to 51 in IEEE 802.11p/bd protocols, j refers to the OFDM symbols, $N_{Sub}$ represents the number of subcarriers, ChannelEstimate represents a specific frequency domain channel estimate, OFDM symbol j=1 corresponds to the channel estimate at the last OFDM symbol of the previous received packet, and OFDM symbol j=2 corresponds to the channel estimate from L-LTF symbol of the current received. In this embodiments, when the calculated coherency of the frequency domain channel estimates is within a predefined threshold, the packet repetition recognition unit is configured to determine that the currently received packet is a repetition of the previously received packet. The predefined threshold may be derived empirically or theoretically. When empirically derived, the predefined threshold can be precomputed based on simulation or experiment results. In addition, when the calculated coherency of the channel estimate is not within the predefined threshold, the packet repetition recognition unit is configured to determine that the currently received packet is not a repetition of the previously received packet.

In some embodiments, the packet repetition recognition unit 452 is configured to compare a frequency domain channel estimation metric associated with different symbols of a currently received packet with a frequency domain channel estimation metric associated with different symbols of a previously received packet to generate packet repetition information that indicates whether the currently received packet is a repetition of the previously received packet. The currently received packet may be received at the receiver 408 immediately (i.e., without any intermediate packet) after the previously received packet is received at the receiver 408. In these embodiments, when a difference between the frequency domain channel estimation metric associated with the different symbols of the currently received packet and the frequency domain channel estimation metric associated with the different symbols of the previously received packet is within (e.g., less than) a predefined threshold, the packet repetition recognition unit is configured to determine that the currently received packet is a repetition of the previously received packet. The predefined threshold may be derived empirically or theoretically. When empirically derived, the predefined threshold can be precomputed based on simulation or experiment results. In addition, when the difference between the frequency domain channel estimation metric associated with the different symbols of the currently received packet and the frequency domain channel estimation metric associated with the different symbols of the previously received packet is not within (e.g., exceeds) the predefined threshold, the packet repetition recognition unit is configured to determine that the currently received packet is not a repetition of the previously received packet. In an embodiment, the packet repetition recognition unit is configured to compare a frequency domain channel resemblance metric (e.g., coherence time) associated with different OFDM symbols of a currently received packet with a frequency domain channel resemblance metric (e.g., coherence time) associated with different OFDM symbols of a previously received packet (e.g., a packet received 60 μsec prior to the currently received packet) to generate packet repetition information that indicates whether the currently received packet is a repetition of the previously received packet. In this embodiment, the packet repetition recognition unit is configured to compare frequency domain channel estimates of different OFDM symbols within the previously received packet (packet$_0$) to derive the coherency time metric of the previously received packet with the following equation:

$$\text{measuredCoherency\_packet}_0 = \frac{\sum_{j=1}^{N_{sym}} \sum_{i=0}^{N_{sub}} |ChannelEstimate_{(i,j)} - ChannelEstimate_{(i,j-1)}|}{\sum_{j=0}^{N_{sym}} \sum_{i=0}^{N_{sub}} |ChannelEstimate_{(i,j)}|}, \quad (5)$$

where i refers to the subcarriers indexing, which may range from 0 to 51 in IEEE 802.11p/bd protocols, j refers to the OFDM symbols, $N_{sym}$ represents the number of symbols within a packet, $N_{Sub}$ represents the number of subcarriers, ChannelEstimate represents a specific frequency domain channel estimate. In addition, the packet repetition recognition unit is configured to compare frequency domain channel estimates of different OFDM symbols within the currently received packet (packet$_1$) to derive the coherency time metric of the currently received packet with the following equation:

$$\text{measuredCoherency\_packet}_1 = \frac{\sum_{j=1}^{N_{sym}} \sum_{i=0}^{N_{sub}} |ChannelEstimate_{(i,j)} - ChannelEstimate_{(i,j-1)}|}{\sum_{j=0}^{N_{sym}} \sum_{i=0}^{N_{sub}} |ChannelEstimate_{(i,j)}|}, \quad (6)$$

where i refers to the subcarriers indexing, which may range from 0 to 51 in IEEE 802.11p/bd protocols, j refers to the OFDM symbols, $N_{sym}$ represents the number of symbols within a packet, $N_{Sub}$ represents the number of subcarriers, ChannelEstimate represents a specific frequency domain channel estimate. In this embodiment, the packet repetition recognition unit compares the coherency time metric of the previously received packet with the coherency time metric of the currently received packet. When the difference between the coherency time metric of the previously received packet and the coherency time metric of the currently received packet is within (e.g., less than) a predefined threshold, the packet repetition recognition unit is configured to determine that the currently received packet is a repetition of the previously received packet. The predefined threshold may be derived empirically or theoretically. When empirically derived, the predefined threshold can be pre-computed based on simulation or experiment results. In addition, the difference between the coherency time metric of the previously received packet and the coherency time metric of the currently received packet is not within (e.g., exceeds) the predefined threshold, the packet repetition recognition unit is configured to determine that the currently received packet is not a repetition of the previously received packet.

In some embodiments, the packet repetition recognition unit 452 is configured to compare at least one time domain channel estimation metric (e.g., a time domain channel delay profile) of a currently received packet with at least one time domain channel estimation metric (e.g., a time domain channel delay profile) of a previously received packet to generate packet repetition information that indicates whether the currently received packet is a repetition of the previously received packet. The currently received packet may be received at the receiver 408 immediately (i.e., without any intermediate packet) after the previously received packet is received at the receiver 408. In these embodiments, when a difference between the at least one time domain channel estimation metric of the currently received packet and the at least one time domain channel estimation metric of the previously received packet is within (e.g., less than) a predefined threshold, the packet repetition recognition unit is configured to determine that the currently received packet is a repetition of the previously received packet. The predefined threshold may be derived empirically or theoretically. When empirically derived, the predefined threshold can be precomputed based on simulation or experiment results. In addition, when the difference between the at least one time domain channel estimation metric of the currently received packet and the at least one time domain channel estimation metric of the previously received packet is not within (e.g., exceeds) the predefined threshold, the packet repetition recognition unit is configured to determine that the currently received packet is not a repetition of the previously received packet.

Figure 6:
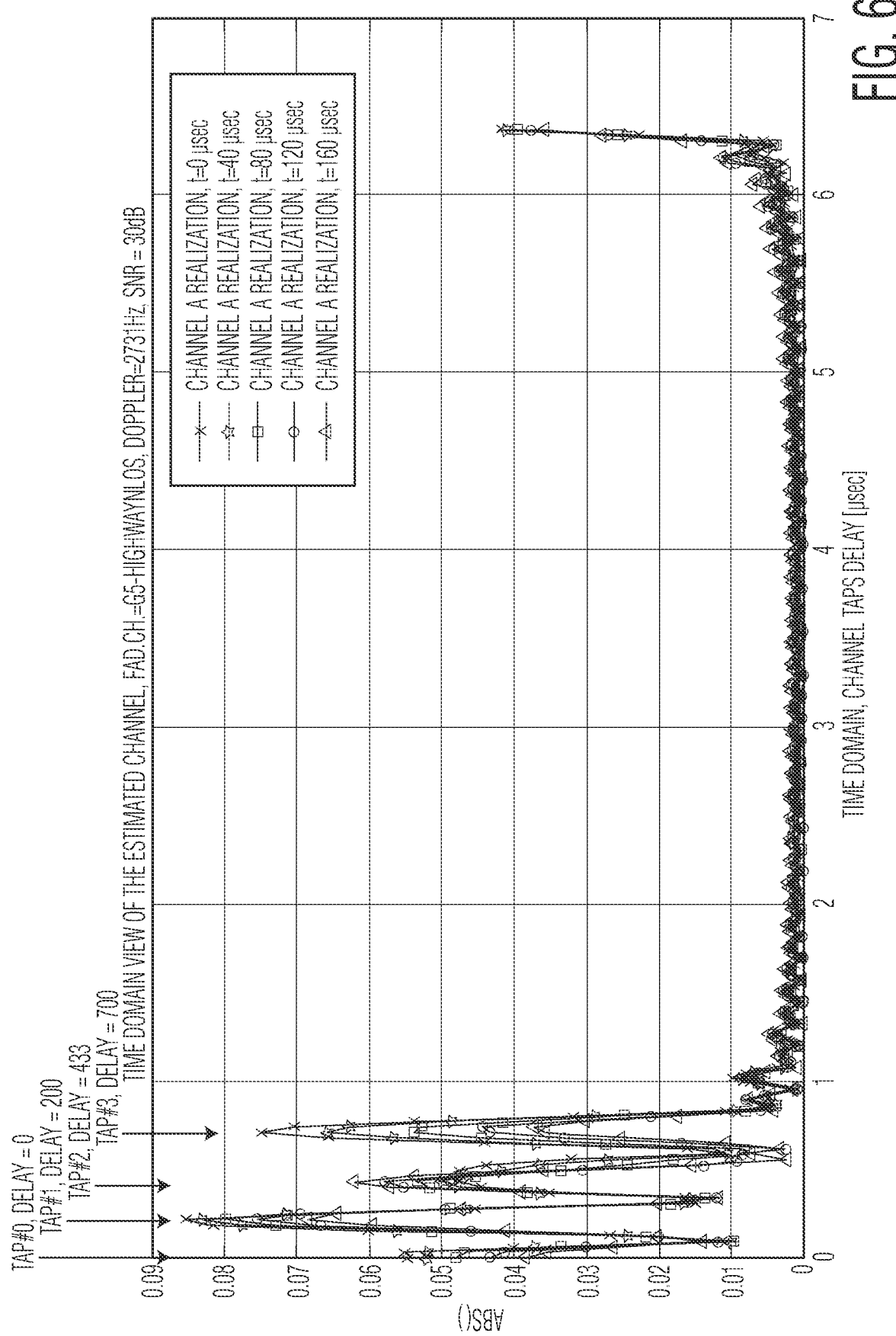
FIGS. 6 and 7 show different channel realizations and corresponding evolution over time in time domain.
Figure 7:
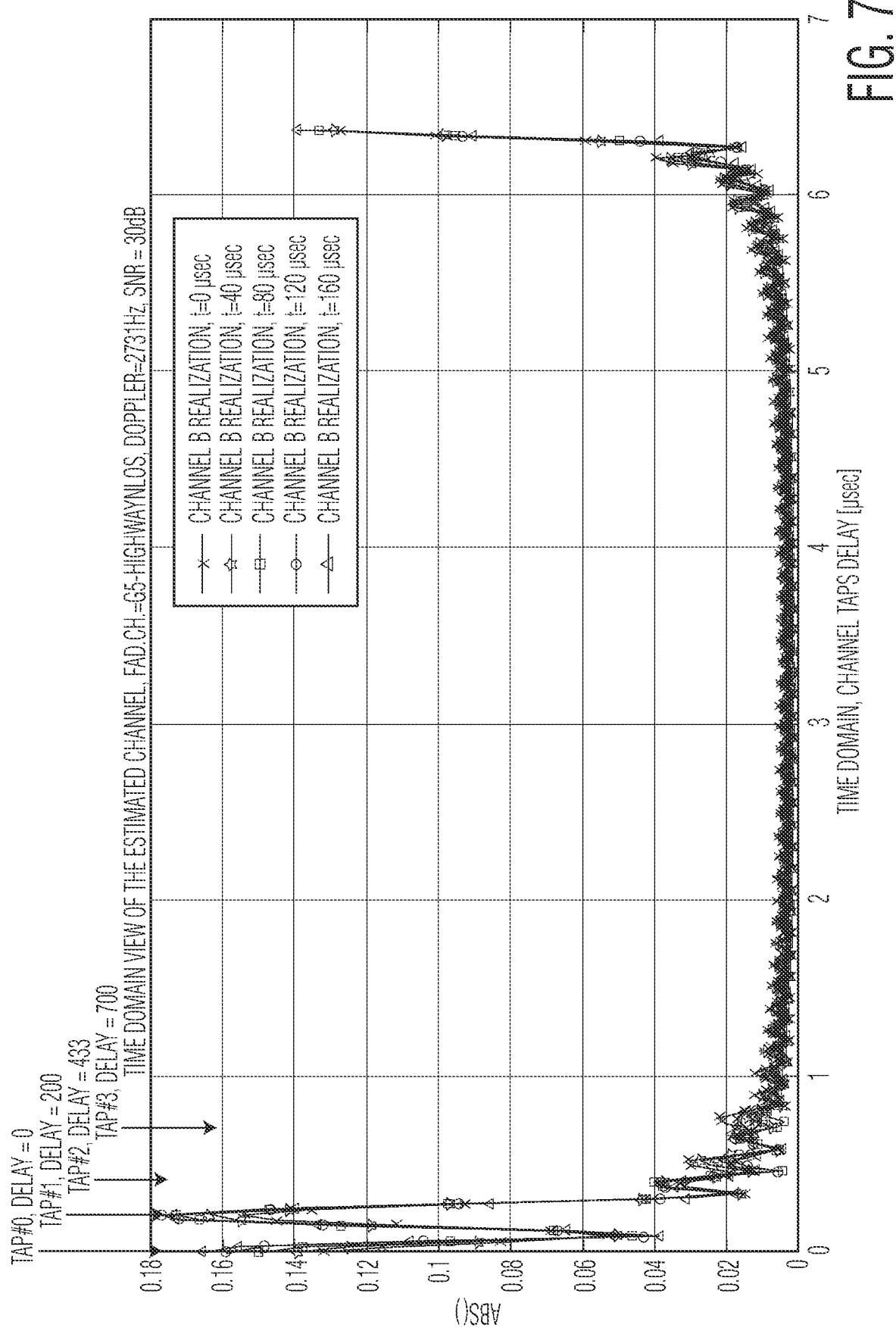

In some embodiments, the receiver 408 (e.g., the channel estimation unit 444, channel estimation update unit 450, and/or the packet repetition recognition unit 452) is configured to generate time domain channel estimation. In an embodiment, the receiver 408 (e.g., the channel estimation unit 444, channel estimation update unit 450, and/or the packet repetition recognition unit 452) is configured to perform an Inverse Discrete Fourier Transform (IDFT) operation on a corresponding frequency domain channel estimate. A time domain profile may be obtained for each OFDM symbol within a received packet. FIGS. 6 and 7 show different channel realizations and corresponding evolution over time in time domain. As shown in FIGS. 6 and 7, each channel realization has a unique set of powers for each delay tap. In an embodiment, the receiver 408 (e.g., the channel estimation unit 444, channel estimation update unit 450, and/or the packet repetition recognition unit 452) is configured to detect channel taps and the respective power of the channel taps. In some embodiments, the receiver 408 (e.g., the channel estimation unit 444, channel estimation update unit 450, and/or the packet repetition recognition unit 452) is configured to measure the coherency of time domain channel taps with the following equation:

$$measuredCoherency_{(time=j)} = \qquad (7)$$

$$\frac{\sum_{j=1}^{N_{sym}} \sum_{i=0}^{N_{sub}} |ChannelTaps_{(i,j)} - ChannelTaps_{(i,j-1)}|}{\sum_{j=0}^{N_{sym}} \sum_{i=0}^{N_{sub}} |ChannelTaps_{(i,j)}|},$$

where i refers to the channel taps indexing, which may range from 0 to M, where M is the transform size of the inverse Fourier transform used to convert the frequency domain channel estimate to a time domain series (it should be noted that only a subset of the channel taps may be used for this metric, since delay profiles typically only appear towards the beginning of the symbol representation in time domain, as delay spread is typically small and meant to be embedded within an equivalent cyclic prefix duration, and also since typically a limited number of taps exhibit a strong value), j refers to the OFDM symbols, $N_{sym}$ represents the number of symbols within a packet, $N_{Sub}$ represents the number of subcarriers, ChannelTaps represents a specific series of time domain channel estimate delay profile taps. In some embodiments, operations in the above equation apply to a subset of the taps (e.g. the union of the top-10 values with stronger amplitude of each delay profile). In some embodiments, the amplitudes and/or phases of channel taps are compared.

In some embodiments, the packet repetition recognition unit 452 is configured to identify peaks corresponding to channel taps, which include delay associated power, and associated phase. The packet repetition recognition unit may obtain a list of channel taps, associated power, and associated phase. The packet repetition recognition unit may identify the channel taps positions and assess the associated power and phase from a time delay profile. For example, the packet repetition recognition unit may obtain four channel taps and associated power as shown in FIGS. 6 and 7. In some embodiments, the packet repetition recognition unit is configured to compare channel taps of a currently received packet with channel taps of a previously received packet (e.g., a packet received 60 μsec prior to the currently received packet) to generate packet repetition information that indicates whether the currently received packet is a repetition of the previously received packet. The packet repetition recognition unit may compare tap by tap of the channel taps of the currently received packet with the channel taps of the previously received packet. Alternatively, the packet repetition recognition unit may compare all of the channel taps of the currently received packet with all of the channel taps of the previously received packet to generate a resemblance metric. In these embodiments, when a difference between the channel taps of the currently received packet and the channel taps of the previously received packet is within (e.g., less than) a predefined threshold, the packet repetition recognition unit is configured to determine that the currently received packet is a repetition of the previously received packet. The predefined threshold may be derived empirically or theoretically. When empirically derived, the predefined threshold can be precomputed based on simulation or experiment results. In addition, when a difference between the channel taps of the currently received packet and the channel taps of the previously received packet is not within (e.g., exceeds) the predefined threshold, the packet repetition recognition unit is configured to determine that the currently received packet is not a repetition of the previously received packet.

In some embodiments, the packet repetition recognition unit 452 is configured to compare a time domain channel estimation metric associated with different symbols of a currently received packet with a time domain channel estimation metric associated with different symbols of a previously received packet to generate packet repetition information that indicates whether the currently received packet is a repetition of the previously received packet. The currently received packet may be received at the receiver 408 immediately (i.e., without any intermediate packet) after the previously received packet is received at the receiver 408. In these embodiments, when a difference between the time domain channel estimation metric associated with the different symbols of the currently received packet and the time domain channel estimation metric associated with the different symbols of the previously received packet is within (e.g., less than) a predefined threshold, the packet repetition recognition unit is configured to determine that the currently received packet is a repetition of the previously received packet. The predefined threshold may be derived empirically or theoretically. When empirically derived, the predefined threshold can be precomputed based on simulation or experiment results. In addition, when the difference between the time domain channel estimation metric associated with the different symbols of the currently received packet and the time domain channel estimation metric associated with the different symbols of the previously received packet is not within (e.g., exceeds) the predefined threshold, the packet repetition recognition unit is configured to determine that the currently received packet is not a repetition of the previously received packet.

In an embodiment, the packet repetition recognition unit 452 is configured to compare a time domain channel resemblance metric (e.g., coherence time) associated with different OFDM symbols of a currently received packet with a time domain channel resemblance metric (e.g., coherence time) associated with different OFDM symbols of a previously received packet (e.g., a packet received 60 μsec prior to the currently received packet) to generate packet repetition information that indicates whether the currently received packet is a repetition of the previously received packet. The currently received packet may be received at the receiver 408 immediately (i.e., without any intermediate packet) after the previously received packet is received at the receiver 408. In this embodiment, the packet repetition recognition unit is configured to compare time domain channel estimates (e.g., channel taps and associated power) of different OFDM symbols within the previously received packet (packet$_0$) to derive the coherency time metric of the previously received packet. In addition, the packet repetition recognition unit is configured to compare time domain channel estimates (e.g., channel taps and associated power) of different OFDM symbols within the currently received packet (packet$_1$) to derive the coherency time metric of the currently received packet. In this embodiment, the packet repetition recognition unit compares the coherency time metric of the previously received packet with the coherency time metric of the currently received packet. When the difference between the coherency time metric of the previously received packet and the coherency time metric of the currently received packet is within (e.g., less than) a predefined threshold, the packet repetition recognition unit is configured to determine that the currently received packet is a repetition of the previously received packet. The predefined threshold may be derived empirically or theoretically. When empirically derived, the predefined threshold can be precomputed based on simulation or experiment results. In addition, the difference between the coherency time metric of the previously received packet and the coherency time metric of the currently received packet is not within (e.g., exceeds) a predefined threshold, the packet repetition recognition unit is configured to determine that the currently received packet is not a repetition of the previously received packet.

Figure 8:
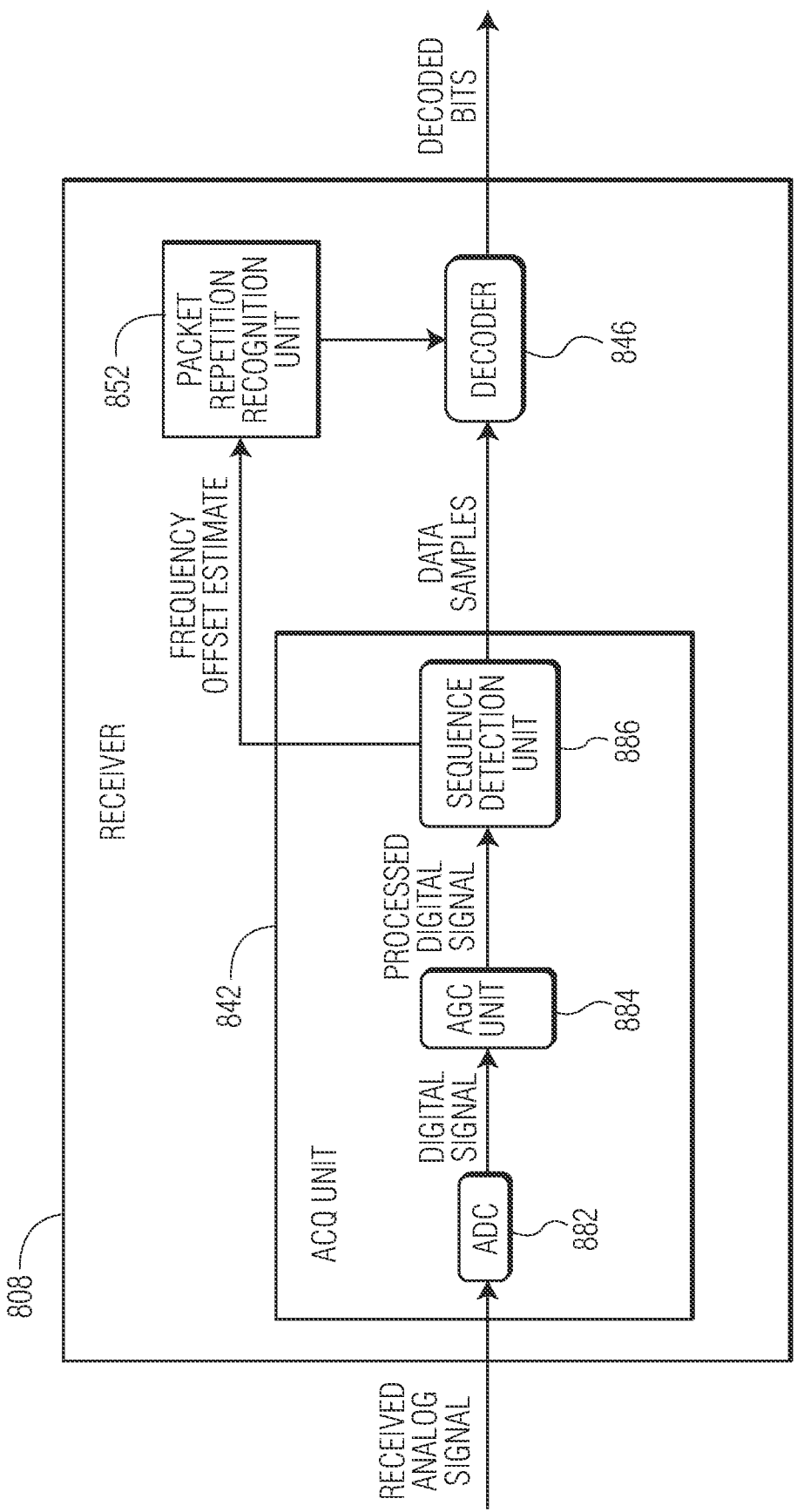
FIG. 8 depicts a receiver that can be used in the wireless communications network depicted in FIG. 1 in accordance with another embodiment of the invention.

FIG. 8 depicts a receiver 808 that can be used in the wireless communications network 100 depicted in FIG. 1 in accordance with another embodiment of the invention. The receiver 808 depicted in FIG. 8 is an embodiment of the transceivers 108-1, 108-2 of the wireless communications devices 102-1, 102-2 depicted in FIG. 1. However, the transceivers 108-1, 108-2 depicted in FIG. 1 are not limited to the embodiment shown in FIG. 8. In the embodiment depicted in FIG. 8, the receiver 808 includes an acquisition (ACQ) unit 842, a decoder 846, and a packet repetition recognition unit 852. In some embodiments, at least one of the ACQ unit, the decoder, and the packet repetition recognition unit is implemented in hardware (e.g., circuits), software, firmware, or a combination thereof. In some embodiments, the receiver is compatible with an Institute of Electrical and Electronics Engineers (IEEE) 802.11 protocol (e.g., IEEE 802.11bd protocol and/or IEEE 802.11p protocol). Although the illustrated receiver 808 is shown in FIG. 8 with certain components and described with certain functionality herein, other embodiments of the receiver 808 may include fewer or more components to implement the same, less, or more functionality. For example, although the packet repetition recognition unit 852 is a component of the receiver 808 in the embodiment depicted in FIG. 8, in other embodiments, the packet repetition recognition unit 852 is located external to the receiver 808. In some embodiments, the packet repetition recognition unit 852 is a component of a corresponding controller (e.g., the controller 110-1 or 110-2 depicted in FIG. 1) of a corresponding wireless communications device (e.g., the wireless communications device 102-1 or 102-2 depicted in FIG. 1).

In the embodiment depicted in FIG. 8, the ACQ unit 842 is configured to process received signals of a packet from a corresponding antenna (e.g., the antenna 106-1 or 106-2 depicted in FIG. 1) to generate additional metrics such as frequency offset estimate of the packet and data samples or symbols of the packet. The ACQ unit 842 can scan incoming IQ samples of a packet and try to identify the legacy short training field (L-STF) pattern of the preamble of the packet, for example, by means of correlations. Once the STF pattern is found, the ACQ unit 842 can perform synchronization of the receiver 808, in terms of time and/or frequency offsets. In the embodiment depicted in FIG. 8, the ACQ unit 842 includes an analog-to-digital converter (ADC) 882 configured to convert a received analog signal into a digital signal, an Automatic gain control (AGC) unit 884 configured to perform automatic gain control to the digital signal to generate a processed digital signal, and a sequence detection unit 886 configured to detect a specific sequence from the processed digital signal. In some embodiments, the sequence detection unit is further configured to detect the legacy short training field (L-STF) pattern of the preamble of a packet. The ACQ unit 842 (e.g., the sequence detection unit) is further configured to produce additional metrics such as frequency offsets of the receiver 808 with respect to a corresponding transmitter. For example, the frequency offset can be estimated by the receiver 808 by comparing phase rotations between incoming L-STF IQ samples and/or correlations, and can be estimated either in one step or iteratively in multiple steps. Frequency offsets measurements can have different resolutions, such as 1 Hz, 10 Hz, 100 Hz, etc. Maximum frequency offset bounds can be set according to a specific application in which the receiver 808 is used (e.g., [−3700:+3700] Hz, assuming a maximum Doppler shift of 500 km/h and 0.2 kHz of timing error), and the resulting measured frequency offset values can potentially be any value within that range (e.g., +750 Hz or −1235 Hz). The observed frequency offset at the receiver 808 is the addition of the transmitter-receiver frequency clocks offset, which implies the drifts at the corresponding transmitter and the receiver 808, and the frequency offset may originate from the wireless propagation channel medium such as Doppler speed between the corresponding transmitter and the receiver 808. The frequency offset due to the transmitter-receiver frequency clocks mismatch evolves slowly and is not expected to vary from one packet to the next. For example, the frequency offset due to the wireless propagation channel medium is expected to remain comparable between the last OFDM symbol a previous packet and the L-STF symbol of the incoming packet, due to channel coherence time being greater than this time gap. The sequence detection unit may be implemented in hardware (e.g., circuits), software, firmware, or a combination thereof.

In the embodiment depicted in FIG. 8, the decoder 846 is configured to decode the data samples of a packet to generate decoded bits. The decoder may be any suitable type of decoder. In some embodiments, the decoder includes an equalizer, a DIL unit, an LLR generation unit, and/or a decoding unit such as a Viterbi decoding unit. In some embodiments, the decoder includes an equalizer configured to perform signal equalization to generate equalized signals, a DIL unit configured to perform signal de-interleaving to the equalized signals from the equalizer, an LLR generation unit configured to generate a log likelihood ratio for the data samples, and a Viterbi decoding unit configured to perform Viterbi decoding based on the log likelihood ratio from the LLR generation unit to generate decoded bits. In some embodiments, at least one of the equalizer, the DIL unit, the LLR generation unit, and/or the Viterbi decoding unit is implemented in hardware (e.g., circuits), software, firmware, or a combination thereof. Although the decoder 846 is described with certain components and certain functionality herein, other embodiments of the decoder 846 may include fewer or more components to implement the same, less, or more functionality. The decoder 846 is not limited to the examples described above.

A study of the relative speed change and its impact on perceived Doppler at the receiver side is described as follows. For a car, the more abrupt changes are when doing emergency braking (not acceleration). Modern cars typically have an emergency braking deceleration of approximately 10 meter/second (m/s$^2$). The following worst case situation is assumed:

Transmitter: an average packet size (~350 bytes) and thus average duration of 0.5 millisecond (ms)

Transmitter: drives at 250 kilometer/hour (km/h) and start emergency braking at exactly t=0
    at t=0, speed=250 km/h (doppler=2731 Hz)
    at t=0.5 ms, speed=249.98 km/h
    at t=1000 ms (1 sec), speed=214 km/h
    at t=6900 ms (6.9 sec), speed=0 km/h
Receiver: drives at 250 km/h in the opposite direction.

TABLE 1

| Time | t = 0 | t = 0.5 ms | t = 1 second | t = 6.9 second |
|---|---|---|---|---|
| Speed Delta [km/h] | 500.00 | 499.98 | 464.00 | 250.00 |
| Doppler [Hz] | 2731.00 | 2370.91 | 2200.29 | 1185.50 |

The relation between relative speed and doppler spread as seen in Table 1 confirms that a time delta of 0.5 ms has almost no impact the observed Doppler at the receiver side.

The possible range of measured frequency offset is quite large, about +/−120 kHz. For example, the maximum frequency offset for IEEE802.11p may be +/−20 ppm at 6 GHz is +/−120 kHz. Going in the same direction, for numerical simulations, frequency offset is usually modelled as being uniformly distributed within plus and minus 20 or 40 ppm. However, a small time delta, in the order of 0.5 ms, has almost no measurable impact on the observed frequency offset as measured by the receiver 808. For example, assuming an average packet size (~350 bytes) and thus average duration of 0.5 ms, the maximum delta between two consecutive repetition of the same transmitter is limited. The ppm offset includes long-term drift. The device clock is adjusted by GPS (typically the 1 PPS pulse is used for this), filtered through an IIR filter. A drift of 2 ms over 30 minutes is equivalent to:

$$time_{offset} = \frac{2 \text{ ms}}{30 \text{ min}} = \frac{2 \text{ ms}}{30*60*1e^3 \text{ ms}} = \frac{2 \text{ ms}}{1800000 \text{ ms}} = 1.1e^{-6} \text{ ppm}, \quad (8)$$

In terms of frequency offset, for the same period of time (e.g., 30 minutes), a drift of $1.1e^{-6}*6$ GHz=6600 Hz can be expected. Consequently, for 1 ms of time, there is a very small drift of less than 1 Hz, as seen in Table 2.

TABLE 2

| Initial value | duration | Delta (absolute Offset) | Delta (fraction of initial value) |
|---|---|---|---|
|  | 30 min | 2 ms | $1.1e^{-6}$ ppm |
| 6e9 | 30 min | 6600 Hz | $1.1e^{-6}$ ppm |
| 6e9 | 1 ms | 0.0036 Hz | $6.1e^{-13}$ ppm |

Consequently, each vehicle has its own "frequency offset signature" in form of a unique frequency offset. The frequency offset values reported by the ACQ unit 842 can be used to distinguish between a repetition of a previously received packet and a new packet, especially under high SNR conditions. In some embodiments, the LTF decoding provides a SNR measurement that can be used as a confidence factor for the frequency estimation accuracy.

In the embodiment depicted in FIG. 8, the packet repetition recognition unit 852 is configured to recognize packet repetition based on packet acquisition information (e.g., one or more ACQ metrics) associated with packets received at the receiver 408. In some embodiments, the packet repetition recognition unit is further configured to generate packet repetition information that indicates whether a currently received packet is a repetition of a previously received packet based on packet acquisition information. For example, the packet repetition recognition unit may generate packet repetition information that indicates whether a currently received packet is a repetition of a previously received packet based on packet acquisition information (e.g., frequency offset estimate) from the ACQ unit 842 (e.g., the sequence detection unit 886). In some embodiments, the packet repetition recognition unit 852 is configured to generate at least one packet acquisition (ACQ) metric for a currently received packet and at least one packet acquisition metric for a previously received packet. In these embodiments, the packet repetition recognition unit 852 compares the at least one packet acquisition metric of the currently received packet with the at least one packet acquisition metric of the previously received packet to generate packet repetition information that indicates whether the currently received packet is a repetition of the previously received packet. The currently received packet may be received at the receiver 808 immediately (i.e., without any intermediate packet) after the previously received packet is received at the receiver 808. In these embodiments, when a difference between the at least one packet acquisition metric of the currently received packet and the at least one packet acquisition metric of the previously received packet is within (e.g., less than) a predefined threshold, the packet repetition recognition unit is configured to determine that the currently received packet is a repetition of the previously received packet. The predefined threshold may be derived empirically or theoretically. When empirically derived, the predefined threshold can be precomputed based on simulation or experiment results. In addition, when the difference between the at least one packet acquisition metric of the currently received packet and the at least one packet acquisition metric of the previously received packet is not within (e.g., exceeds) the predefined threshold, the packet repetition recognition unit is configured to determine that the currently received packet is not a repetition of the previously received packet. The packet repetition information that is generated by the packet repetition recognition unit can be used by the receiver 808 to improve the performance of packet processing. In some embodiments, the receiver 808 processes the currently received packet and the previously received packet in combination when the currently received packet is a repetition of the previously received packet. For example, the receiver 808 decodes the currently received packet and the previously received packet in combination when the currently received packet is a repetition of the previously received packet. In these embodiments, the receiver 808 processes (e.g., decodes) the currently received packet and the previously received packet independently from each other when the currently received packet is not a repetition of the previously received packet. By combining the processing of repetitive packets, the performance of the receiver can be improved. In the embodiment depicted in FIG. 8, the packet repetition recognition unit sends the packet repetition information to the decoder for combined decoding of repetitive packets. By combining the decoding of repetitive packets, the performance of the receiver can be improved.

In some embodiments, the ACQ metrics that are generated by the ACQ unit 842 include frequency offset estimates of the receiver 808 with respect to a corresponding transmitter or corresponding transmitters. The frequency offset observed at the receiver 808 is the addition of the transmitter-receiver frequency clocks offset, which implies the drifts at a corresponding transmitter and the receiver 808. In these embodiments, the packet repetition recognition unit 852 is configured to generate at a frequency offset estimate for a currently received packet and a frequency offset estimate for a previously received packet. In these embodiments, the packet repetition recognition unit 852 compares the frequency offset estimate of the currently received packet with the frequency offset estimate of the previously received packet to generate packet repetition information that indicates whether the currently received packet is a repetition of the previously received packet. When the difference between the frequency offset estimate of the currently received packet and the frequency offset estimate of the previously received packet is within (e.g., less than) a predefined threshold, the packet repetition recognition unit is configured to determine that the currently received packet is a repetition of the previously received packet. The predefined threshold may be derived empirically or theoretically. In addition, when the difference between the frequency offset estimate of the currently received packet and the frequency offset estimate of the previously received packet is not within (e.g., exceeds) the predefined threshold, the packet repetition recognition unit is configured to determine that the currently received packet is not a repetition of the previously received packet.

Figure 9:
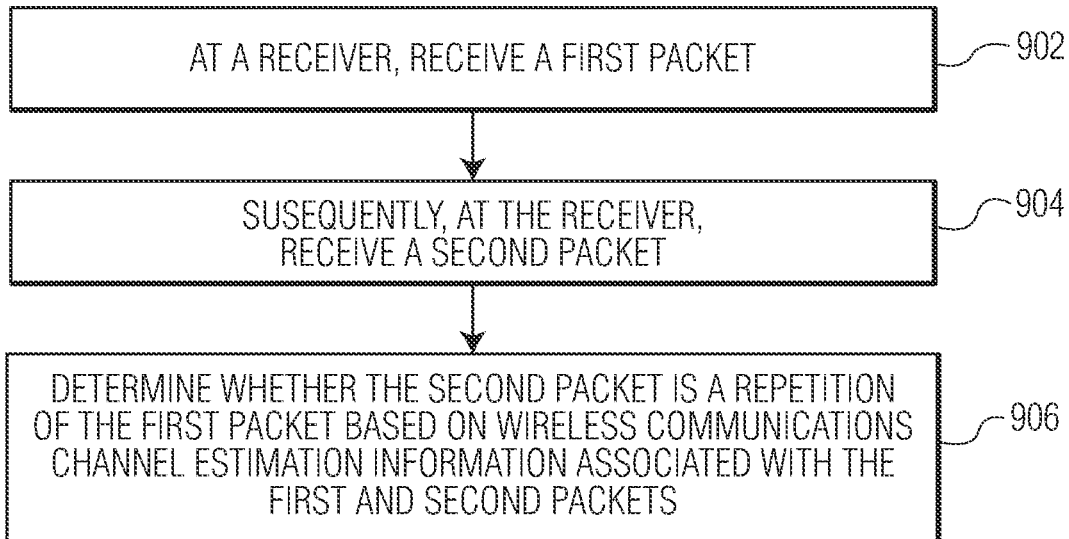
FIG. 9 is a process flow diagram of a method of wireless communications in accordance to an embodiment of the invention.

FIG. 9 is a process flow diagram of a method of wireless communications in accordance to an embodiment of the invention. According to the method, at block 902, at a receiver, a first packet is received. At block 904, subsequently, at the receiver, a second packet is received. At block 906, it is determined whether the second packet is a repetition of the first packet based on wireless communications channel estimation information associated with the first and second packets. The receiver may be similar to, the same as, or a component of the transceivers 108-1, 108-2 depicted in FIG. 1, the receiver 408 depicted in FIG. 4, and/or the receiver 808 depicted in FIG. 8.

Figure 10:
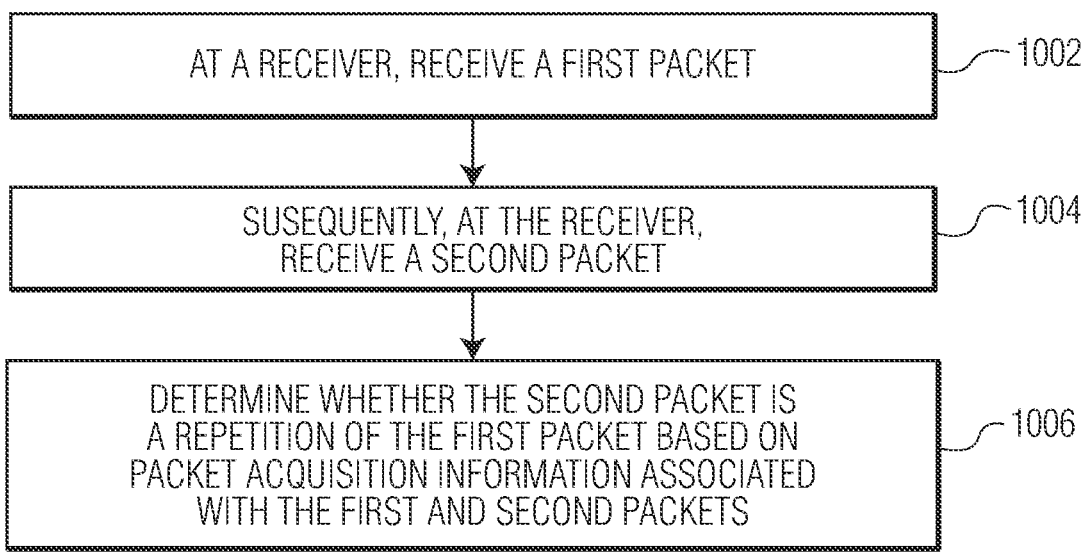
FIG. 10 is a process flow diagram of a method of wireless communications in accordance to another embodiment of the invention.

FIG. 10 is a process flow diagram of a method of wireless communications in accordance to another embodiment of the invention. According to the method, at block 1002, at a receiver, a first packet is received. At block 1004, subsequently, at the receiver, a second packet is received. At block 1006, it is determined whether the second packet is a repetition of the first packet based on packet acquisition information associated with the first and second packets. The receiver may be similar to, the same as, or a component of the transceivers 108-1, 108-2 depicted in FIG. 1, the receiver 408 depicted in FIG. 4, and/or the receiver 808 depicted in FIG. 8.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods described herein may be implemented using software instructions stored on a computer useable storage medium for execution by a computer. As an example, an embodiment of a computer program product includes a computer useable storage medium to store a computer readable program.

The computer-useable or computer-readable storage medium can be an electronic, magnetic, optical, electromagnetic, infrared, or semiconductor system (or apparatus or device). Examples of non-transitory computer-useable and computer-readable storage media include a semiconductor or solid-state memory, magnetic tape, a removable computer diskette, a random-access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD).

Alternatively, embodiments of the invention may be implemented entirely in hardware or in an implementation containing both hardware and software elements. In embodiments which use software, the software may include but is not limited to firmware, resident software, microcode, etc.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A wireless communications device, comprising:
a receiver configured to receive a first packet and a second packet; and
a controller configured to determine whether the second packet is a repetition of the first packet based on wireless communications channel estimation information associated with the first and second packets.

2. The device of claim 1,
wherein the controller is configured to generate,
a first wireless communications channel estimation metric for the first packet and
a second wireless communications channel estimation metric for the second packet.

3. The device of claim 2,
wherein the controller is configured to determine that the second packet is a repetition of the first packet when a difference between the first wireless communications channel estimation metric and the second wireless communications channel estimation metric is within a predefined threshold.

4. The device of claim 3,
wherein the controller is configured to determine that the second packet is not a repetition of the first packet when the difference between the first wireless communications channel estimation metric and the second wireless communications channel estimation metric is not within the predefined threshold.

5. The device of claim 1,
wherein the wireless communications channel estimation information associated with the first and second packets includes frequency domain channel estimation information associated with the first and second packets.

6. The device of claim 5, wherein the frequency domain channel estimation information associated with the first and second packets includes,
a first frequency domain channel estimation metric of a symbol of the first packet and
a second frequency domain channel estimation metric of a symbol of the second packet.

7. The device of claim 6,
wherein the symbol of the first packet includes a last data symbol of the first packet, and
wherein the symbol of the second packet includes a legacy long training field (L-LTF) symbol of the second packet.

8. The device of claim 6,
wherein the controller is configured to calculate a coherency metric of
the first frequency domain channel estimation metric of the symbol of the first packet and
the second frequency domain channel estimation metric of the symbol of the second packet.

9. The device of claim 8,
wherein the controller is configured to determine whether the second packet is a repetition of the first packet based on the coherency metric.

10. The device of claim 5, wherein the frequency domain channel estimation information associated with the first and second packets includes,
- a first frequency domain channel estimation metric associated with different symbols of the first packet and
- a second frequency domain channel estimation metric associated with different symbols of the second packet.

11. The device of claim 10,
wherein the controller is configured to determine that the second packet is a repetition of the first packet when a difference between the first frequency domain channel estimation metric and the second frequency domain channel estimation metric is within a predefined threshold.

12. The device of claim 11,
wherein the controller is configured to determine that
- the second packet is not a repetition of the first packet when the difference between the first frequency domain channel estimation metric and
- the second frequency domain channel estimation metric is not within the predefined threshold.

13. The device of claim 5, further comprising
wherein the controller is configured to derive
- a first coherency time metric based on a plurality of frequency domain channel estimates of the different symbols of the first packet and
- a second coherency time metric based on a plurality of frequency domain channel estimates of the different symbols of the second packet.

14. The device of claim 1,
wherein the wireless communications channel estimation information associated with the first and second packets includes
- time domain channel estimation information associated with the first and second packets.

15. The device of claim 14,
wherein the time domain channel estimation information associated with the first and second packets includes,
- a first plurality of channel taps of the first packet and
- a second plurality of channel taps of the second packet.

16. The device of claim 15,
wherein the controller is configured to determine whether the second packet is a repetition of the first packet by comparing the first plurality of channel taps of the first packet with the second plurality of channel taps of the second packet.

17. The device of claim 14,
wherein the time domain channel estimation information associated with the first and second packets includes,
- a first time domain channel estimation metric associated with different symbols of the first packet and
- a second time domain channel estimation metric associated with different symbols of the second packet.

18. The device of claim 17, further comprising
wherein the controller is configured to derive
- a first coherency time metric based on a plurality of time domain channel estimates of the different symbols of the first packet and
- a second coherency time metric based on a plurality of time domain channel estimates of the different symbols of the second packet.

19. A method of wireless communications, the method comprising:
- at a receiver, receiving a first packet;
- subsequently, at the receiver, receiving a second packet; and
- determining whether the second packet is a repetition of the first packet based on wireless communications channel estimation information associated with the first and second packets;
- wherein the wireless communications channel estimation information associated with the first and second packets includes frequency domain channel estimation information associated with the first and second packets.

20. A method of wireless communications, the method comprising:
- at a receiver, receiving a first packet;
- subsequently, at the receiver, receiving a second packet; and
- determining whether the second packet is a repetition of the first packet based on wireless communications channel estimation information associated with the first and second packets;
- wherein the wireless communications channel estimation information associated with the first and second packets includes time domain channel estimation information associated with the first and second packets; and
- wherein the time domain channel estimation information associated with the first and second packets includes a first plurality of channel taps of the first packet and a second plurality of channel taps of the second packet.

* * * * *